United States Patent

[11] 3,596,727

| [72] | Inventor | Vincent A. Graham<br>Rte. 1, Salem, S. Dak. 57058 |
|---|---|---|
| [21] | Appl. No. | 829,461 |
| [22] | Filed | June 2, 1969 |
| [45] | Patented | Aug. 3, 1971 |

[54] RUNNER ATTACHMENT FOR MOTORCYCLE
6 Claims, 5 Drawing Figs.

[52] U.S. Cl. .................................. 180/5,
180/9.24, 180/9.3
[51] Int. Cl. ..................................... B62m 27/02
[50] Field of Search ........................... 180/5, 9.24, 9.3

[56] References Cited
UNITED STATES PATENTS

| 1,825,133 | 9/1931 | Spacsek | 180/5 |
| 2,323,526 | 7/1943 | Eliason | 180/5 |
| 2,487,297 | 11/1949 | Berman | 180/5 |
| 3,336,994 | 8/1967 | Pederson | 180/5 |
| 3,412,820 | 11/1968 | Wachholz | 180/5 |

*Primary Examiner*—Milton Buchler
*Assistant Examiner*—Paul E. Sauberer
*Attorney*—Lucas J. De Koster

ABSTRACT: A device adapted to convert a motorcycle into a vehicle adapted to be driven over snow covered surfaces including a skilike front runner for attachment to a front wheel and a similar runner for the rear wheel; the rear runner having a belt driven by power from the cycle engine.

Patented Aug. 3, 1971 3,596,727
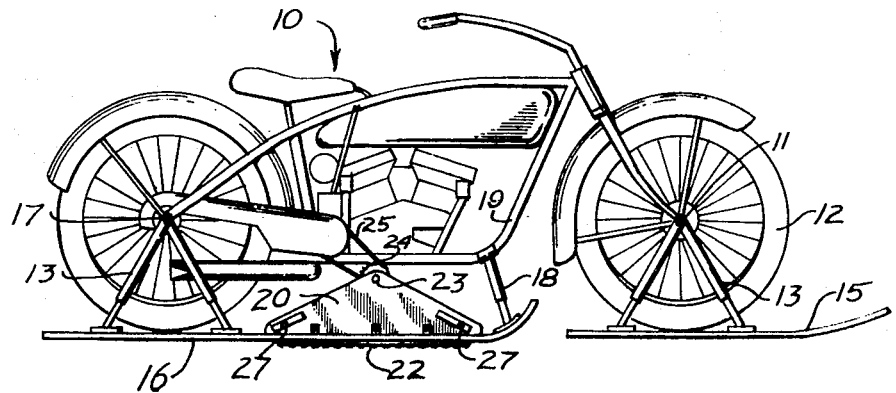
Fig. 1
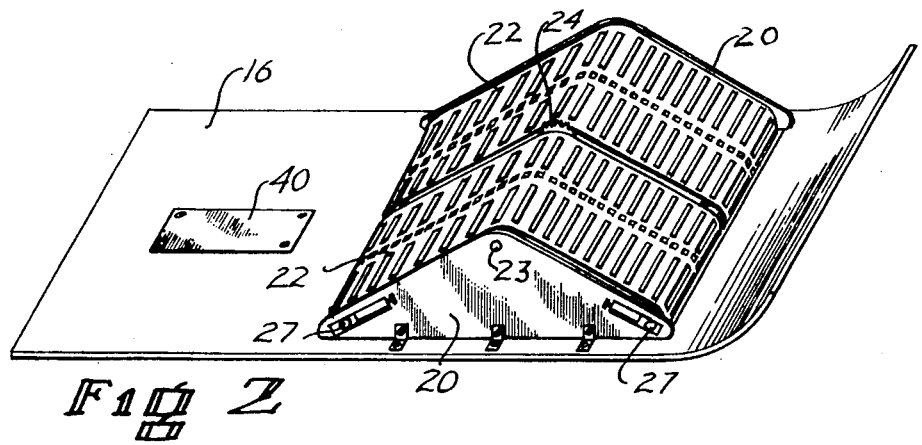
Fig. 2
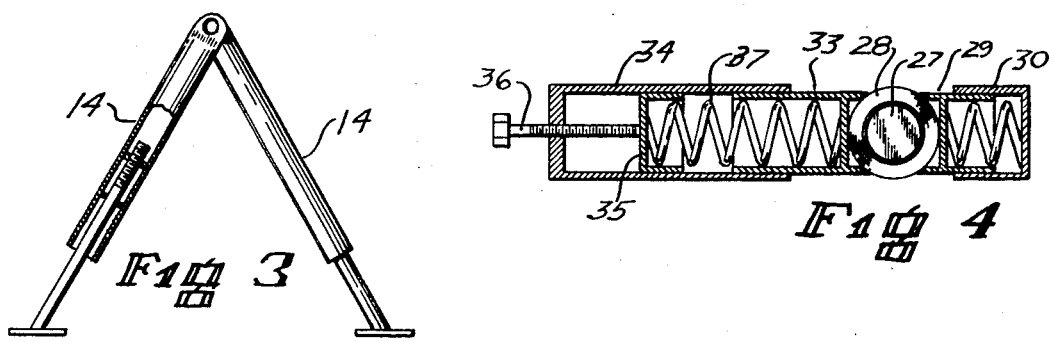
Fig. 3
Fig. 4
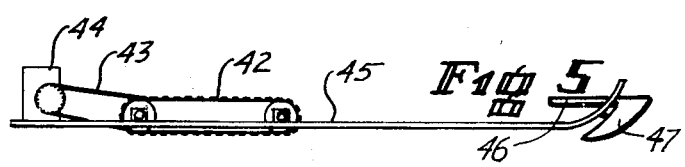
Fig. 5
Vincent A. Graham
INVENTOR.
BY Lucas J. DeKoster
HIS ATT'Y

RUNNER ATTACHMENT FOR MOTORCYCLE

BACKGROUND AND SUMMARY OF THE INVENTION

This invention pertains to vehicles for travel over snow covered surfaces, and more particularly to a conversion device adapted to be used in conjunction with a motorcycle to form such a vehicle.

One of the recent sports vehicles which has achieved great popularity is the motorcycle. Another is the device known as the snowmobile. The motorcycle by reason of being an open air device of generally unstable nature especially on slippery surfaces, is principally a warm weather vehicle. In contrast, the snowmobile, by reason of the requirement of a snow or ice covered surface over which it must be propelled, is principally a cold weather vehicle. These simple statements of fact clearly indicate the attraction of a device which will combine the features of both vehicles.

By my invention, I provide such a device, usable either in the warm seasons as a motorcycle, in the cold season as a snowmobile, and also providing for dry surface use in the colder seasons.

FIGURES

FIG. 1 is a side elevational view of my device completely assembled for use as a snowmobile, FIG. 2 is an isometric view of the main runner and drive assembly removed from the motorcycle, FIG. is a detailed view of the mounting bracket with part broken away to show the adjustability, FIG. 4 is a detailed view to an enlarged scale of the spring-loaded adjustable belt tightener, and FIG. 5 is an elevational view of an alternative embodiment of my invention.

DESCRIPTION

Briefly my invention comprises removable runners for attachment to a motorcycle, one of the runners carrying a welted belt driven by means of being connected to the power unit of the motorcycle. The belt is adapted to engage the surface over which the vehicle travels to drive it.

More specifically, and referring to the drawings, my device is adapted for attachment to a motorcycle shown generally at 10. Attached to the hub 11 of the front wheel 12 on each side is is a mounting bracket 13 having the shape of an inverted V. Each of the legs 14 of V is preferably adjustably longitudinally thereof. Such adjustment may be by screw means such as shown in FIG. 3, or by any other usable means known to those skilled in the art.

A front ski 15 is fastened to the lower ends of the legs 14. This ski is normally carried by the legs in position such that the wheel 12 either is slightly above the upper surface of the ski or lightly rests on that surface, or a cover mounted on the surface as will be described.

A rear ski 16 is similarly mounted on a similar mounting bracket 13 from the rear hub 17, and a single member bracket 18 affixed to the frame 19 of the cycle. This ski may be somewhat wider than the front ski in order to carry the traction means for the conveyance.

This traction means is mounted on the ski 16 by means of a pair of triangular end plates 20 fixed to the ski. These plates carry journal means for three shafts adapted to hold the pairs of belts 22 in place and provide carriers for them. The drive shaft 23 is journaled in a fixed position at the top of the triangle. This shaft carries a sprocket 24 attached to it adapted to be driven by the regular motorcycle chain 25 or one similar to the regular chain by of different length. Power is transmitted to the belts 22 from the shaft 23 by sprocket means or similar device not shown because they are common in the art.

A pair of idler shafts 27 are used to guide the belts 22. Each of these shafts is adjustably mounted at one of the lower corners of the triangular plate 20. The adjustment means is spring loaded as best shown in FIG. 4.

Each shaft 27 is journaled in a bearing 28 carried between cylindrical holders. The lower holder 29 is telescoped into a mounted lower cup 30. This cup is mounted on the plate 20. A compression spring 32 is engaged between the cup 30 and the holder 29 to urge the holder 29 into engagement with the bearing.

The upper holder 33 is somewhat longer than the lower, but is similarly telescoped into an upper cup 34. Also slidably disposed in the upper cup 34 is an upper spring retainer 35 which is adjustable relative to the upper cup 34 by means of a screw device 36 or similar adjustment means. A compression spring 37 is engaged between the retainer 35 and the holder 33. This spring holds the upper holder 33 against the bearing 28, but because of the adjustability of the retainer 35 also provides for slight adjustable motion of the bearing 28 and axle 27, thus allowing for tightening or loosening the belts 22.

A removable plate 40 is provided on the rear ski 16, and a similar plate may be provided on the front ski. These plates may be removed for use of the cycle on dry ground when it is not desired to remove all of the ski apparatus. The ski may then be raised to allow the wheels to extend through the ski, the chain be returned to drive the rear wheel, and the device can be returned to limited use as a motorcycle.

The alternate device shown in FIG. 5 shows how the idea of a belt 42 driven by a chain 43 from a motor 44 can be applied to convert a toboggan 45 into a snowmobile. A tiller 46 may be hinged to the front of the toboggan to provided steering through a forward rudder 47.

I claim:

1. Conversion means, for mounting on a motorcycle having front and rear axles and wheels mounted on said axles, comprising in combination; ski means mounted on both said axles, triangular plates mounted on at least one of said ski means, shafts journaled at each of the corners of said plates, welted belt means arranged over said shafts such that the belt extends below said ski means, said belt means being driven by at least one of said shafts, thereby forming a traction means, and drive means operably connected between said motorcycle and said traction means to drive the traction means and propel the assembly.

2. The device of claim 1 in which each plate has an upper corner and two lower corners, a drive shaft journaled at said upper corner and operably connected to said drive means, and idler shafts journaled at each of said lower corners.

3. The device of claim 2 in which said drive means includes sprocket means N said drive shaft, chain means engaged between said sprocket means and said motorcycle whereby said chain means drives said belts.

4. The device of claim 2 in which said idler shafts are journaled in adjustable mounting means attached to said plates.

5. The device of claim 4 in which said mounted means provide resilient mounting for said shafts.

6. Conversion means, for mounting on a motorcycle having front and rear axles and wheels mounted on said axles, comprising in combination; ski means adjustably mounted on both axles, said ski means each being formed to provide an opening adjacent to said wheels whereby said ski means may be adjusted toward said wheel until the wheel extends through said opening, plate means removably mounted on said ski over said openings when said ski means are adjusted so that said wheels do not extend therethrough, traction means mounted on at least one of said ski means and adapted to extend below said ski means, and drive means operably connected between said motorcycle and said traction means to drive said traction means and propel the assembly.